US012398735B2

(12) United States Patent
Liu et al.

(10) Patent No.: US 12,398,735 B2
(45) Date of Patent: Aug. 26, 2025

(54) ADJUSTABLE LOAD PRESSURE COMPENSATION BALANCING SYSTEM, END COVER AND COUNTERBALANCE VALVE

(71) Applicant: JIANGSU ADVANCED CONSTRUCTION MACHINERY INNOVATION CENTER LTD., Suzhou (CN)

(72) Inventors: Yingying Liu, Suzhou (CN); Yanan Zhai, Suzhou (CN); Danfeng Su, Suzhou (CN)

(73) Assignee: JIANGSU ADVANCED CONSTRUCTION MACHINERY INNOVATION CENTER LTD., Jiangsu (CN)

( * ) Notice: Subject to any disclaimer, the term of this patent is extended or adjusted under 35 U.S.C. 154(b) by 0 days.

(21) Appl. No.: 18/031,149

(22) PCT Filed: Dec. 9, 2021

(86) PCT No.: PCT/CN2021/136608
§ 371 (c)(1),
(2) Date: Apr. 11, 2023

(87) PCT Pub. No.: WO2023/092666
PCT Pub. Date: Jun. 1, 2023

(65) Prior Publication Data
US 2024/0117824 A1 Apr. 11, 2024

(30) Foreign Application Priority Data
Nov. 25, 2021 (CN) ........................ 202111408275.5

(51) Int. Cl.
*F15B 13/04* (2006.01)

(52) U.S. Cl.
CPC ................................ *F15B 13/0402* (2013.01)

(58) Field of Classification Search
CPC ........................... F15B 13/0402; F15B 13/029
(Continued)

(56) References Cited

FOREIGN PATENT DOCUMENTS

| | | |
|---|---|---|
| CN | 203570734 | 4/2014 |
| CN | 204096970 | 1/2015 |

(Continued)

OTHER PUBLICATIONS

WO-2013056442-A1, Machine Translation (Year: 2013).*
(Continued)

*Primary Examiner* — Daphne M Barry
(74) *Attorney, Agent, or Firm* — JCIPRNET

(57) ABSTRACT

Disclosed are an adjustable load pressure compensation balancing system, an end cover, and a counterbalance valve. The adjustable load pressure compensation balancing system comprises: an adjustable orifice control module and a counterbalance valve control module, wherein the adjustable orifice control module is used for receiving control oil generated when a luffing system descends and oil from a descending cavity of a luffing cylinder; the counterbalance valve control module is used for receiving the control oil generated when the luffing system descends; the pressure applied to the counterbalance valve control module by the control oil is maximum when the luffing system starts to descend, and then decreases gradually; and the pressure applied to the adjustable orifice control module by the oil from the descending cavity is minimum when the luffing system starts to descend, and then increases gradually.

14 Claims, 4 Drawing Sheets

(58) Field of Classification Search
USPC .............................................. 137/424, 484.2
See application file for complete search history.

(56) References Cited

FOREIGN PATENT DOCUMENTS

| | | | | |
|---|---|---|---|---|
| CN | 105298951 | | 2/2016 | |
| CN | 108266415 | | 7/2018 | |
| CN | 114321071 | | 4/2022 | |
| WO | WO-2013056442 | A1 * | 4/2013 | ............. B66C 23/82 |
| WO | 2017144860 | | 8/2017 | |

OTHER PUBLICATIONS

CN203570734U , Machine Translation (Year: 2013).*
“International Search Report (Form PCT/ISA/210) of PCT/CN2021/136608”, mailed on Aug. 29, 2022, with English translation thereof, pp. 1-4.
“Written Opinion of the International Searching Authority (Form PCT/ISA/237) of PCT/CN2021/136608”, mailed on Aug. 29, 2022, with English translation thereof, pp. 1-5.

* cited by examiner

ADJUSTABLE LOAD PRESSURE COMPENSATION BALANCING SYSTEM, END COVER AND COUNTERBALANCE VALVE

CROSS-REFERENCE TO RELATED APPLICATION

This application is a 371 of international application of PCT application serial no. PCT/CN2021/136608, filed on Dec. 9, 2021, which claims the priority benefit of China application no. 202111408275.5, filed on Nov. 25, 2021. The entirety of each of the above mentioned patent applications is hereby incorporated by reference herein and made a part of this specification.

TECHNICAL FIELD

The invention relates to an adjustable load pressure compensation balancing system, an end cover and a counterbalance valve, and belongs to the technical field of engineering machines, particularly to the field of engineering machines with a luffing mechanism.

RELATED ART

Engineering machines, such as truck cranes, crawler cranes and rotary drilling rigs, are provided with a luffing mechanism. When the luffing mechanism descends, the force arm of the luffing mechanism increases gradually, and the luffing mechanism descends more and more rapidly and even stalls, leading to accidents such as rollovers.

An adjustable load pressure compensation counterbalance valve can be used for the luffing mechanism. When the luffing mechanism descends, the load pressure increases gradually, and in this process, the flow of the counterbalance valve is controlled to decrease gradually to realize stable descending of the luffing mechanism.

At present, a first solution to realizing stable descending of the luffing mechanism is hydraulic power compensation, which decreases the opening degree of a throttling port of the counterbalance valve by closing a spool region by means of hydraulic power; a second solution to realizing stable descending of the luffing mechanism is servo control, which decreases the opening degree of the throttling port of the counterbalance valve by transmitting the load pressure to a spring cavity of the counterbalance valve through an orifice; a third solution to realizing stable descending of the luffing mechanism is to guide the load pressure to the spring cavity of the counterbalance valve by means of a switch valve, which in turn reversely push the spool to decrease the opening degree of the throttling port of the counterbalance valve.

(1) The compensation effect of the counterbalance valve adopting hydraulic power compensation is unsatisfactory, the flow decreases with the increase of the load pressure, and the compensation rate and the compensation inflection point cannot be adjusted.

(2) The counterbalance valve realizing compensation by servo control controls the compensation effect through an orifice, so the compensation effect is good, and the compensation rate can be adjusted; however, the compensation inflection point cannot be adjusted and cannot optimally matches a host computer; because this solution adopts servo control, the product structure is complex, the part machining precision is high, and the anti-pollution capacity is poor;

(3) By adopting the solution of guiding the load pressure to the spring cavity of the counterbalance valve through a switch valve, the opening pressure of the counterbalance valve will increase accordingly with the increase of the load pressure, and even the counterbalance valve may close after being opened during the opening process of the counterbalance valve, leading to a sudden change of the flow; in addition, metal sealing is used twice, so the number of leaking points is large, and leaking is difficult to control.

SUMMARY OF INVENTION

The technical issue to be settled by the invention is to overcome the defects of the prior art by providing an adjustable load pressure compensation balancing system, an end cover and a counterbalance valve.

To settle the above technical issue, the invention provides an adjustable load pressure compensation balancing system, which comprises: an adjustable orifice control module and a counterbalance valve control module;

The adjustable orifice control module is used for receiving control oil generated when a luffing system descends and oil from a descending cavity of a luffing cylinder, and the quantity of the control oil received by the adjustable orifice control module is increased with the increase of a pressure applied to the adjustable orifice control module by the oil from the descending cavity of the luffing cylinder;

The counterbalance valve control module is used for receiving the control oil generated when the luffing system descends, and the quantity of the oil received by the counterbalance valve control module from the descending cavity is decreased with the decrease of the quantity of the control valve control module acting on the counterbalance valve control module;

The pressure applied to the counterbalance valve control module by the control oil is maximum when the luffing system starts to descend, and then decreases gradually;

A pressure applied to the adjustable orifice control module by the oil from the descending cavity is minimum when the luffing system starts to descend, and then increases gradually.

Furthermore, the adjustable load pressure compensation balancing system further comprises:

An overcompensation rate adjustment module used for adjusting an overcompensation rate of the counterbalance valve control module through a plurality of detachable orifices.

Furthermore, the plurality of detachable orifices comprise two orifices, which are a first orifice and a second orifice respectively.

Furthermore, the adjustable orifice control module comprises an adjustable orifice, and the adjustable orifice comprises an adjustable orifice oil passage and an adjustable orifice control cavity;

Two ends of the adjustable orifice oil passage are connected with a control oil input port and a drainage port respectively, and the drainage port is used for recycling the control oil and oil in a counterbalance valve spring cavity of the counterbalance valve control module;

The adjustable orifice control cavity is used for receiving oil from the descending cavity of the luffing cylinder, the adjustable orifice oil passage is adjusted according to the pressure of the oil from the descending cavity, and the adjustable orifice oil passage becomes larger with the increase of the pressure.

Furthermore, the adjustable orifice control module further comprises a third orifice;

The oil from the descending cavity passes through the third orifice and is then input to the control cavity of the adjustable orifice.

Furthermore, the counterbalance valve control module comprises a counterbalance valve, and the counterbalance valve comprises a first counterbalance valve oil passage, a second counterbalance valve oil passage and a counterbalance valve control cavity;

The counterbalance valve control cavity is used for receiving the control oil, the first counterbalance valve oil passage is adjusted according to the pressure of the control oil, the first counterbalance valve oil passage becomes larger with the increase of the pressure, and when the control oil is not received, the first counterbalance valve oil passage is disconnected;

A check valve is disposed in the second counterbalance valve oil passage, and the second counterbalance valve oil passage is connected only when the luffing system ascends.

Furthermore, the counterbalance valve control module further comprises a fourth orifice;

The oil in the counterbalance valve spring cavity returns to the drainage port through the fourth orifice.

Furthermore, the adjustable load pressure compensation balancing system further comprises a backpressure check valve;

An output end of the backpressure check valve is connected with the drainage port;

An input end of the backpressure check valve is connected with one end of the adjustable orifice oil passage, and the first orifice or the second orifice.

Furthermore, when the input end of the backpressure check valve is connected with one end of the adjustable orifice oil passage, the other end of the adjustable orifice oil passage is connected with the first orifice and the second orifice, the first orifice is also connected with the control oil input port, and the second orifice is also connected with the counterbalance valve control cavity.

Furthermore, when the input end of the backpressure check valve is connected with the first orifice, the first orifice is also connected with the second orifice and one end of the adjustable orifice oil passage, the other end of the adjustable orifice oil passage is connected with the control oil input port, and the second orifice is also connected with the counterbalance valve control cavity.

Furthermore, when the input end of the backpressure check valve is connected with the second orifice, the second orifice is also connected with the first orifice and one end of the adjustable orifice oil passage, the first orifice is also connected with the control oil input port, and the other end of the adjustable orifice oil passage is connected with the counterbalance valve control cavity.

Furthermore, the adjustable load pressure compensation balancing system comprises a filter screen disposed at the control oil input port.

An adjustable load pressure compensation counterbalance valve comprises the adjustable load pressure compensation balancing system.

An end cover for an adjustable load pressure compensation counterbalance valve comprises an end cover valve body, wherein:

A first cavity, a second cavity and a third cavity are formed in the end cover valve body, and the first cavity and the second cavity are connected with the third cavity;

An inlet of the first cavity is a control oil input port, and a filter screen and a first orifice are sequentially disposed inwards from the inlet of the first cavity;

A backpressure check valve is disposed in the second cavity, and an input end of the backpressure check valve is located on a side close to the third cavity;

An adjustable orifice is disposed in the third cavity.

Furthermore,

The adjustable orifice comprises a plug, a spool on the adjustable orifice, a variable throttling groove, a spring seat, a spring (35), a spring shield and an adjusting screw;

The plug, the spool on the adjustable orifice, the spring seat and the spring are sequentially arranged in the direction of the third cavity;

The spring has an end connected with the spring seat and an end connected with the adjusting screw, and the spring shield is disposed outside the spring;

The variable throttling groove is formed in the spool on the adjustable orifice;

The spool on the adjustable orifice has an end connected with a load port of a counterbalance valve located outside the end cover valve body, as well as an end connected with the spring seat (34), and the variable throttling groove (32) is connected with a counterbalance valve control cavity of the counterbalance valve (7)

Furthermore, the end cover further comprises a Glyd ring;

The Glyd ring is mounted in a groove in the spool on the adjustable orifice.

Furthermore, the end cover further comprises an O ring;

The O ring is mounted between the spring shield and the end cover valve body.

Furthermore, the end cover further comprises a combined sealing gasket and a protective cap;

The protective cap is connected with the adjusting screw and presses the combined sealing gasket on an end surface of the spring shield.

An adjustable load pressure compensation counterbalance valve comprises the end cover for an adjustable load pressure compensation counterbalance valve.

The invention has the following beneficial effects:

(1) In the invention, the overcompensation rate of the counterbalance valve can be changed by adjusting the orifices, adjustment is more convenient through the orifices, and various overcompensation rates can be realized through different orifices.

(2) In the invention, a pilot control orifice network is formed by an adjustable orifice and fixed orifices to control the opening degree of the spool of the counterbalance valve, such that pilot pressure fluctuations can be effectively filtered.

(3) In the invention, the adjustable orifice is realized by a variable throttling groove in the slide spool, and the change gradient of the orifice is small, so the spool of the counterbalance valve can move more stably.

(4) In the invention, the opening degree of the adjustable orifice is controlled by the load pressure, such that the pilot control pressure of the counterbalance valve is reduced, and the flow of the counterbalance valve decreases with the increase of the load pressure.

(5) In the invention, the inflection point of the compensatory pressure can be changed by adjusting the pretightening force of the spring, to optimally match different host computers.

(6) In the invention, the load pressure is sealed with metal at only one point, so leaking is easy to control.

(7) In the invention, the backpressure check valve is disposed in the orifice network, and when the pilot pressure is lower than the pressure of the backpressure check valve, compensation will not work, so the opening pressure of the counterbalance valve will not change with the load pressure.

LF, luffing; LC, luffing cylinder; DLC, descending cavity; 1, filter screen; 2, first orifice; 3, adjustable orifice; 4, backpressure check valve; 5, second orifice; 6, third orifice; 7, counterbalance valve; 7A, first counterbalance valve oil passage; 7B, second counterbalance valve oil passage; 7C, counterbalance valve control cavity; 8, fourth orifice; 9, end cover valve body; 9A, third cavity; 9B, second cavity; 9C, first cavity; 10, protective cap; 11, groove; 30, plug; 31, spool on adjustable orifice; 32, variable throttling groove; 33, Glyd Ring; 34, spring seat; 35, spring; 36, O ring; 37, spring shield; 38, adjusting screw; 39, combined sealing gasket; 41, backpressure check valve body; 42, backpressure check valve spring; 43, steel ball; A, multi-way valve port; B, counterbalance valve load port; K, control oil input port; T, drainage port.

DESCRIPTION OF EMBODIMENTS

The invention will be further described below in conjunction with the accompanying drawings. The following embodiments are merely used for explaining the technical solutions of the invention more clearly, and should not be construed as limitations of the protection scope of the invention.

Embodiment 1

Figure 1:
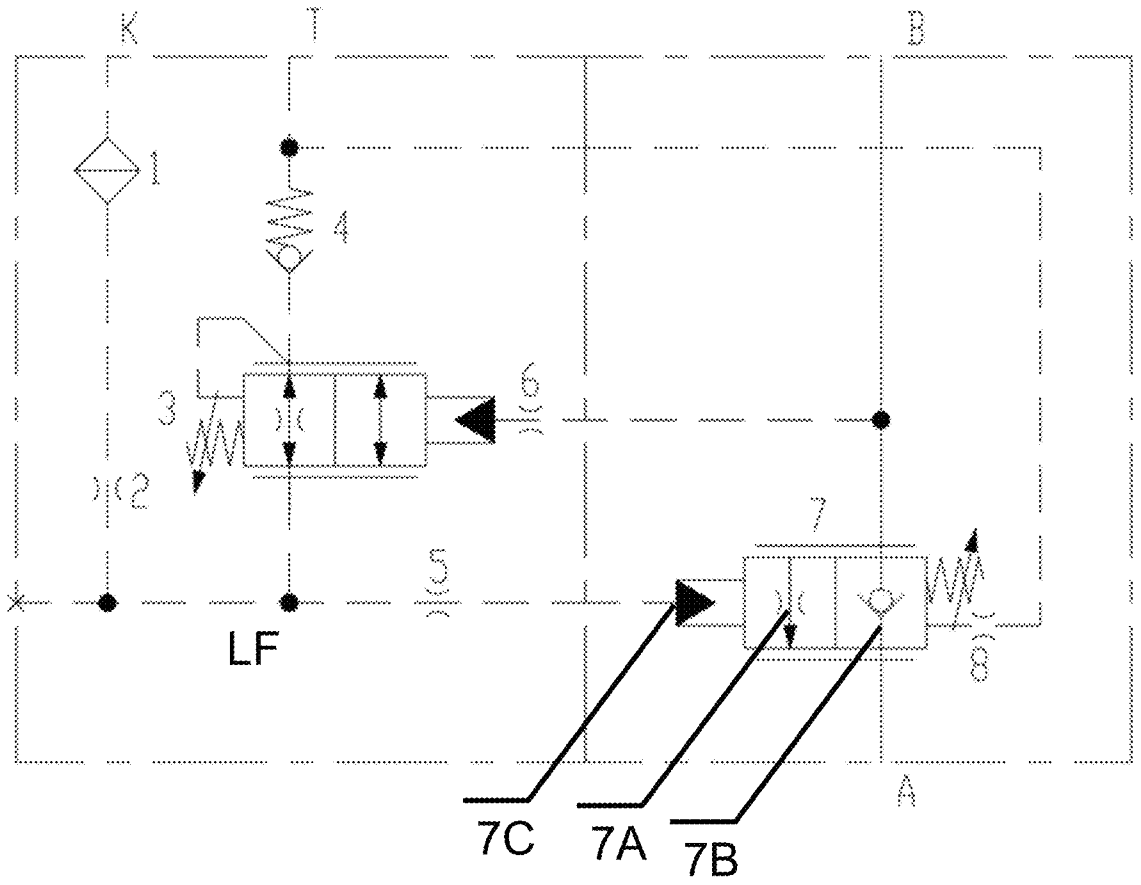
FIG. 1 is a first schematic diagram of an adjustable load pressure compensation counterbalance valve.
Figure 1A:
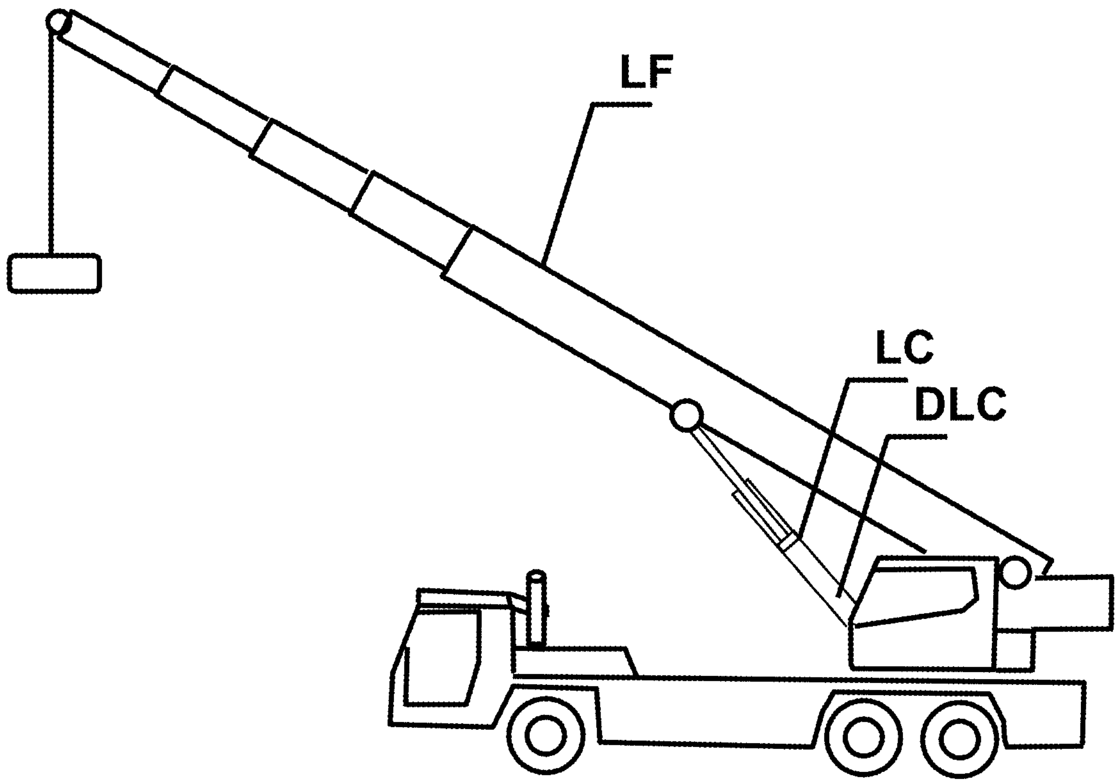
FIG. 1A is a schematic diagram of a luffing and a luffing cylinder.

As shown in FIG. 1, an adjustable load pressure compensation balancing system comprises: a filter screen 1, a first orifice 2, an adjustable orifice 3, a backpressure check valve 4, a second orifice 5, a third orifice 6, a counterbalance valve 7, and a fourth orifice 8; a counterbalance valve load port B is connected with a descending cavity of a luffing cylinder, and a multi-way valve port A of the counterbalance valve 7 is generally passes through a working oil port of a multi-way valve; and when a luffing system descends, oil in the descending cavity of the luffing cylinder flows to the multi-way valve port A through the counterbalance valve load port B and then returns to an oil tank through the multi-way valve.

A control pressure generated when the luffing system descends is connected with a control oil input port K of a control end cover, and is then connected with the second orifice 5 at a counterbalance valve input through the filter screen 1, the first orifice 2 at a system inlet, and the adjustable orifice 3 of a bypass circuit; the adjustable orifice 3 is connected with a drainage port T through the backpressure check valve 4; the second orifice 5 is connected with a control cavity of the counterbalance valve 7; the counterbalance valve load port B is connected with a control cavity of the adjustable orifice 3 through the third orifice 6; and a spring cavity of the counterbalance valve 7 is connected with the drainage cavity T through the fourth orifice 8.

In the invention, the overcompensation rate is controlled through orifices, and the overcompensation inflection point is changed by adjusting the spring pre-tightening force of the adjustable orifice. When the luffing system descends, control oil flows into the control cavity of the counterbalance valve 7 through the control oil input port K, the filter screen 1, the first orifice 2 and the second orifice 5, the counterbalance valve 7 is opened, oil in the spring cavity of the counterbalance valve 7 returns to the drainage port T through the fourth orifice 8, oil in the descending cavity of the luffing cylinder flows to the multi-way valve port A through the counterbalance valve load port B, the luffing cylinder descends, the pressure of the luffing cylinder is transmitted to the control cavity of the adjustable orifice 3 through the third orifice 6, the diameter of the adjustable orifice 3 is controlled to increase, and the control pressure is transmitted to the drainage port T through the filter screen 1, the first orifice 2, the adjustable orifice 3 and the backpressure check valve 4; with the increase of the pressure of the counterbalance valve load port B, the diameter of the adjustable orifice 3 increases accordingly, the flow of control oil reaching the drainage port T through the adjustable orifice increases, and the control pressure transmitted to the counterbalance valve 7 decreases, so a spool of the counterbalance valve 7 is closed, the flow from the counterbalance valve load port B to the multi-way valve port A is reduced, the pressure of the counterbalance valve port B is increased, and the flow passing through the counterbalance valve is reduced.

In the invention, the overcompensation rate of the counterbalance valve can be changed by adjusting the first orifice 2 and the second orifice 5, adjustment is more convenient through the orifices, and various overcompensation rates can be realized through the two orifices. For example, by increasing the diameter of the first orifice 2 or decreasing the diameter of the second orifice 5, the overcompensation rate can be increased; otherwise, the overcompensation rate can be decreased.

In the invention, the adjustable orifice 3 is used for realizing compensation; when the pressure of the counterbalance valve load port B is increased, the opening degree of a throttling port of the adjustable orifice 3 is enlarged to control the pressure of the counterbalance valve 7 to decrease, the opening degree of the counterbalance valve 7 is reduced, and in this way, the flow passing through the counterbalance valve 7 will decrease will the increase of the pressure of the counterbalance valve load port B.

In the invention, the compensation inflection point can be changed by adjusting the spring pre-tightening force of the adjustable orifice 3. Specifically, when the spring pre-tightening force is increased, the compensation inflection point of the counterbalance valve is increased; otherwise, the compensation inflection point is decreased.

Embodiment 2

Figure 2:
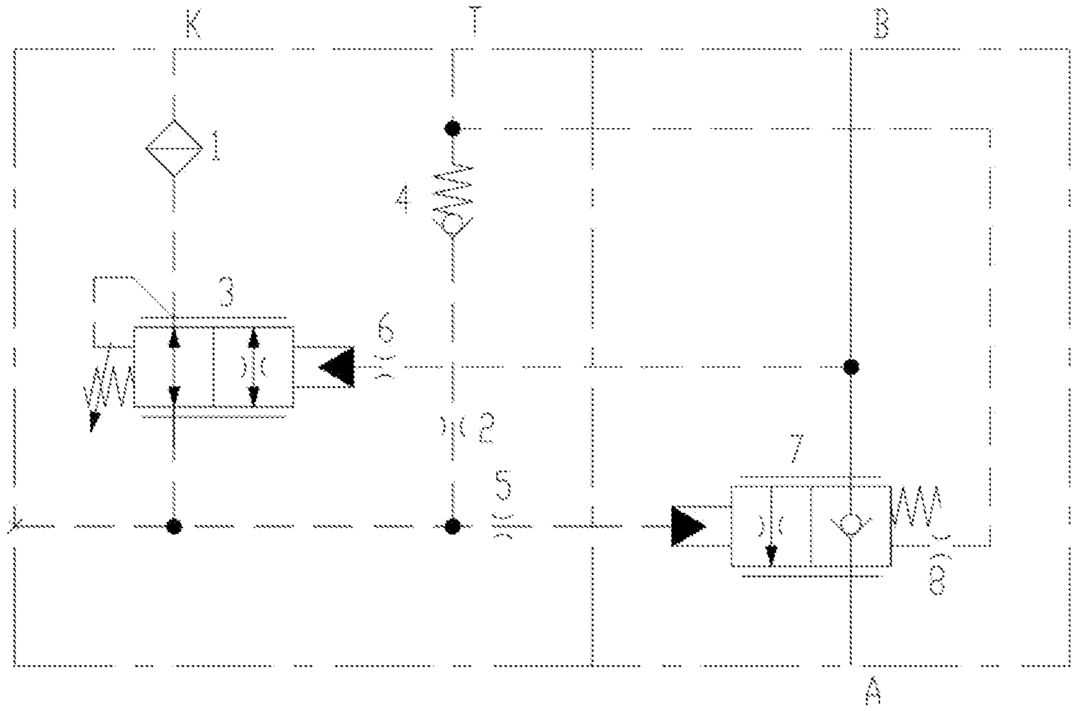
FIG. 2 is a second schematic diagram of the adjustable load pressure compensation counterbalance valve.

As shown in FIG. 2, this embodiment provides another implementation of the adjustable load pressure compensation balancing system, which can fulfill the same effect by changing the position of the adjustable orifice 3. Different from Embodiment 1, in this embodiment, an input end of the backpressure check valve 4 is connected with the first orifice 2, the first orifice 2 is also connected with the second orifice 5 and one end of an adjustable orifice oil passage, the other end of the adjustable orifice oil passage is connected with the control oil input port K, the second orifice 5 is also connected with the control cavity of the counterbalance valve, and the first orifice 2 is mounted on a bypass circuit. When the pressure of the counterbalance valve load port B is increased, the opening degree of the adjustable orifice 3 is controlled to decrease, so the control pressure transmitted to the control cavity of the counterbalance valve 7 through the second orifice 5 is decreased, and the flow from the counterbalance valve load port B of the counterbalance valve 7 to the multi-way valve port A is decreased.

Embodiment 3

Figure 3:
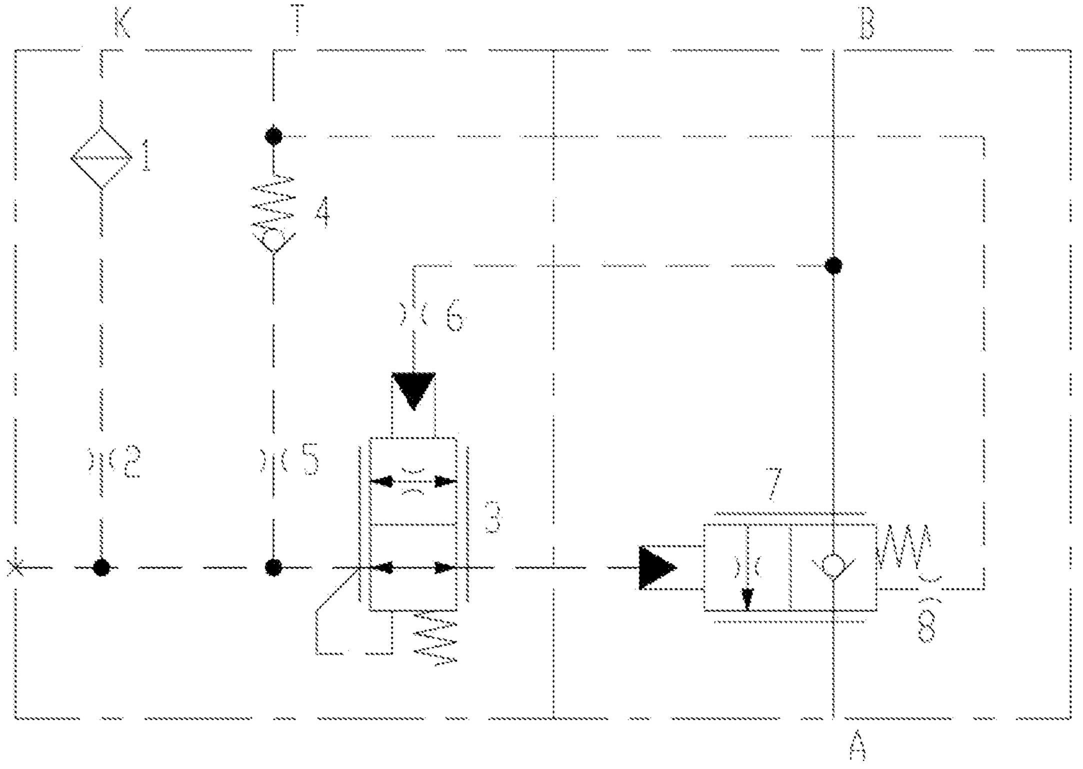
FIG. 3 is a third schematic diagram of the adjustable load pressure compensation counterbalance valve.

As shown in FIG. 3, this embodiment provides another implementation of the adjustable load pressure compensation balancing system, which can fulfill the same effect by changing the position of the adjustable orifice 3. Different from Embodiment 1, in this embodiment, an input end of the backpressure check valve is connected with the second orifice 5, the second orifice 5 is also connected with the first orifice 2 and one end of an adjustable orifice oil passage, the first orifice 2 is also connected with the control oil input port, and the other end of the adjustable orifice oil passage is connected with the control cavity of the counterbalance valve. In this embodiment, the first orifice 2 is mounted at a counterbalance valve inlet, and the second orifice 5 is mounted on a bypass circuit. When the pressure of the counterbalance valve load port B is increased, the opening degree of the adjustable orifice 3 is controlled to decrease, so the control pressure transmitted to the control cavity of the counterbalance valve 7 through the adjustable orifice 3 is decreased, and the flow from the counterbalance valve load pot B of the counterbalance valve 7 to the multi-way valve port A is decreased.

Embodiment 4

Figure 4:
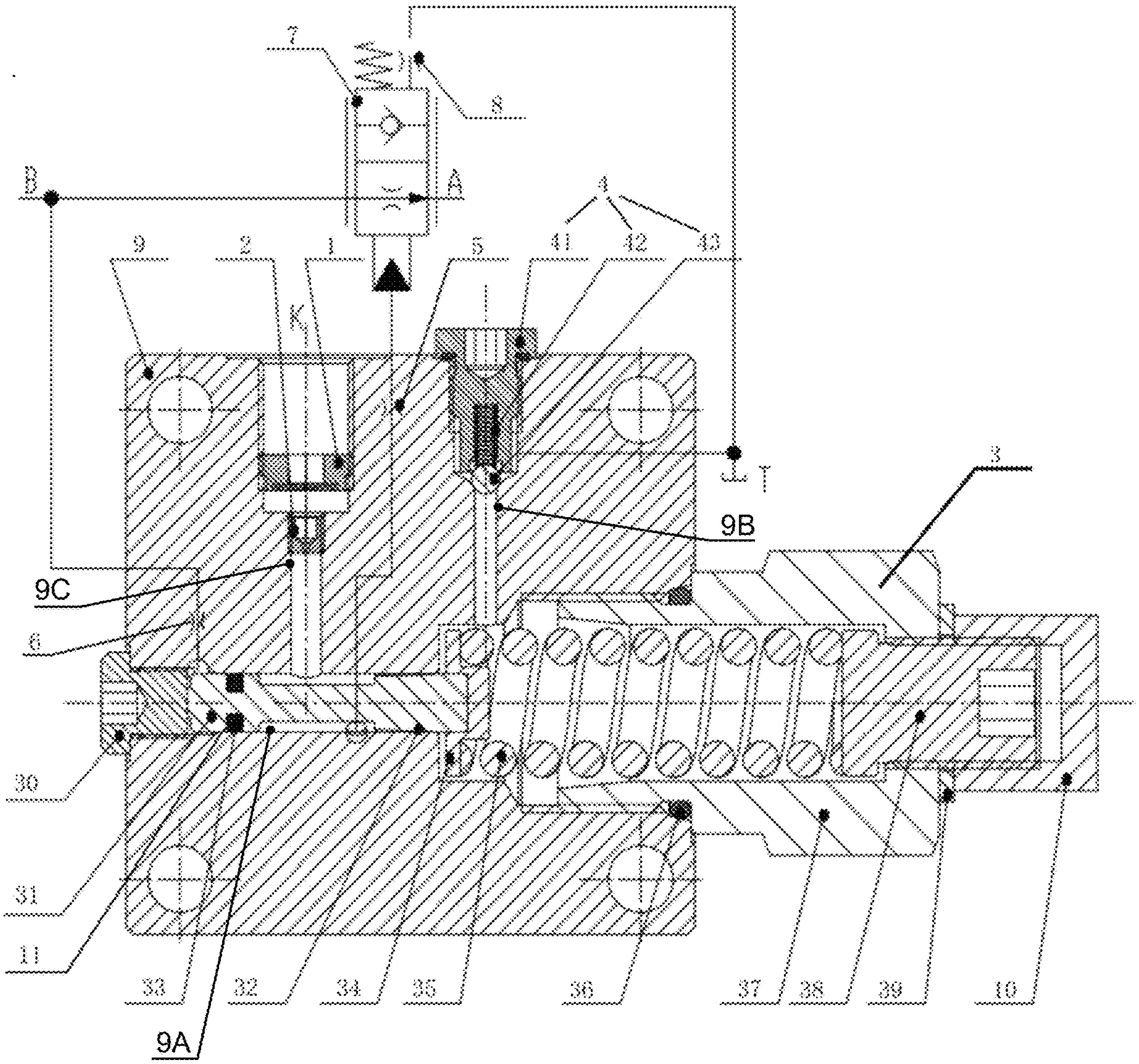
FIG. 4 is a structural diagram of an end cover for an adjustable load pressure compensation counterbalance valve.

As shown in FIG. 4 which is a structural diagram for implementing a first principle of an adjustable load pressure compensation counterbalance valve, the adjustable load pressure compensation counterbalance valve is composed of an end cover valve body 9, a first orifice 2, a filter screen 1, a backpressure check valve 4 (comprising a backpressure check valve body 41, a backpressure check valve spring 42, and a steel ball 43), an adjustable orifice 3 (comprising a plug 30, a spool on the adjustable orifice 31, a variable throttling groove 32, a Glyd Ring 33, a spring seat 34, a spring 35, an O ring 36, a spring shield 37, an adjusting screw 38, a combined sealing gasket 39 and a protective cap 10), a second orifice 5, a counterbalance valve 7 and a fourth orifice 8. Wherein, the end cover valve body 9, the first orifice 2, the filter screen 1, the backpressure check valve body 41, the backpressure check valve spring 42, the steel ball 43, the plug 30, the spool on the adjustable orifice 31, the throttling groove 32, the Glyd Ring 33, the spring seat 34, the spring 35, the O ring 36, the spring shield 37, the adjusting screw 38, the combined sealing gasket 39, the protective cap 10 and the second orifice 5 are integrated on an end cover, such that different functions of the counterbalance valve can be realized by changing different end covers, and the end cover is easy to change and maintain.

The variable throttling groove 32 is formed in the spool on the adjustable orifice 31; after the Glyd Ring 33 is mounted in a groove in the spool on the adjustable orifice 31, the spool on the adjustable orifice 31 is mounted in a third cavity of the end cover valve body 9, with one end being connected with the counterbalance valve load port B and the other end being connected with the spring seat 34; the spring 35 is mounted on the spring seat 34, the spring shield 37 is mounted on the end cover valve body 9, the O ring 36 is mounted on the spring shield 37 to ensure that the spring shield 37 and the end cover valve body 9 are sealed, and the adjusting screw 38 is threadedly mounted on the spring shield 37 and is in contact with the spring 35; and the protective cap 10 is threadedly connected with the adjusting screw 38 and presses the combined sealing gasket 39 on an end surface of the spring shield 37. The filter screen 1 is threadedly mounted at a control port in the end cover valve body 9, the first orifice 2 is threadedly mounted downstream of the filter screen at the control oil input port K of the end cover valve body 9, a middle area of the spool on the adjustable orifice 31 is connected with the second orifice 5 through a hole in the third cavity, the second orifice 5 is connected with the counterbalance valve 7, and oil in the spring cavity of the counterbalance valve 7 returns to a drainage port T through the fourth orifice 8. The backpressure check valve body 41, the backpressure check valve spring 42 and the steel ball 43 constitute the backpressure check valve. Pressure oil in the spring cavity of the adjustable orifice 3 returns to the drainage port T through the backpressure check valve 4.

In the invention, parts such as the spool on the adjustable orifice 31, the spring seat 34, and the spring 35 are integrated in the end cover valve body, so the compensation function of the counterbalance valve can be realized by changing the end cover.

In the invention, the spool on the adjustable orifice 31 is of a slide valve structure, and the variable throttling groove 32 is formed in the spool on the adjustable orifice, such that the spool can move, and the opening degree of a throttling port of the adjustable orifice can be increased or decreased. The pre-tightening force of the spring 35 can be adjusted through the adjusting screw 38, so as to change the overcompensation inflection point of the counterbalance valve.

In the invention, the adjustable orifice 3 is used as a bypass orifice, and when the control pressure fluctuates, the pressure fluctuation can be eliminated through the bypass orifice, such that shaking of the counterbalance valve is reduced.

In the invention, the overcompensation rate of the counterbalance valve can be changed by changing the diameter of the first orifice 2 or the second orifice 5.

In the invention, the opening pressure of the backpressure check valve 4 (composed of the backpressure check valve body 41, the backpressure check valve spring 42 and the steel ball 43) is set to be slightly higher than the opening pressure of the counterbalance valve, so when the counterbalance valve is opened, the backpressure check valve will not be opened and the compensation function is disabled, and the opening pressure of the counterbalance valve will not affected by the pressure of the counterbalance valve load port B.

In the invention, the Glyd Ring 33 is mounted on the spool on the adjustable orifice 31 to isolate the pressure of the port B of the counterbalance valve 18, so the pressure of the load port B of the counterbalance valve is sealed with metal once, so leaking is easier to control.

The above embodiments are merely preferred ones of the invention. It should be pointed out that various improvements and transformations can be made by those ordinarily skilled in the art without departing from the technical principle of the invention, and all these improvements and transformations should also fall within the protection scope of the invention.

What is claimed is:

1. An adjustable load pressure compensation balancing system, comprising:

an adjustable orifice control module, wherein the adjustable orifice control module is used for receiving control oil when a luffing descends and oil from a descending cavity of a luffing cylinder, and the volume of the control oil passes through the adjustable orifice control module is increased with the increase of a pressure applied to the oil from the descending cavity;

a counterbalance valve control module, wherein the counterbalance valve control module is used for receiving the control oil when the luffing descends, and the volume of the oil passes from the descending cavity through the counterbalance valve control module is decreased with the decrease of the volume of the control oil acting on the counterbalance valve control module;

an overcompensation rate adjustment module, used for adjusting an overcompensation rate of the counterbalance valve control module by disposing a plurality of detachable orifices;

wherein the pressure applied to the counterbalance valve control module by the control oil is maximum when the luffing starts to descend, and then decreases;

wherein a pressure applied to the adjustable orifice control module by the oil from the descending cavity is minimum when the luffing starts to descend, and then increases, wherein the plurality of detachable orifices comprise two orifices, which are a first orifice and a second orifice respectively, wherein the adjustable orifice control module comprises an adjustable orifice, and the adjustable orifice comprises an adjustable orifice oil passage and an adjustable orifice control cavity, two ends of the adjustable orifice oil passage are connected with a control oil input port and a drainage port respectively, and the drainage port is used for recycling the control oil and oil in a counterbalance valve spring cavity of the counterbalance valve control module, the adjustable orifice control cavity is used for receiving oil from the descending cavity of the luffing cylinder, a size of the adjustable orifice oil passage is adjusted according to the pressure of the oil from the descending cavity, and the adjustable orifice oil passage becomes larger with the increase of the pressure, wherein the counterbalance valve control module comprises a counterbalance valve, and the counterbalance valve comprises a first counterbalance valve oil passage, a second counterbalance valve oil passage and a counterbalance valve control cavity, the counterbalance valve control cavity is used for receiving the control oil, a size of the first counterbalance valve oil passage is adjusted according to the pressure of the control oil, the first counterbalance valve oil passage becomes larger with the increase of the pressure, and when the control oil is not received, the first counterbalance valve oil passage is disconnected, and a check valve is disposed in the second counterbalance valve oil passage, and the second counterbalance valve oil passage is connected only when the luffing ascends, and wherein the counterbalance valve control module further comprises a fourth orifice, and the oil in the counterbalance valve spring cavity returns to the drainage port through the fourth orifice.

2. The adjustable load pressure compensation balancing system according to claim 1, wherein the adjustable orifice control module further comprises a third orifice;

the oil from the descending cavity passes through the third orifice and is then input to the adjustable orifice control cavity.

3. The adjustable load pressure compensation balancing system according to claim 1, further comprising a backpressure check valve, an output end of the backpressure check valve is connected with the drainage port;

an input end of the backpressure check valve is connected with one end of the adjustable orifice oil passage, and the first orifice or the second orifice.

4. The adjustable load pressure compensation balancing system according to claim 3, wherein when the input end of the backpressure check valve is connected with one end of the adjustable orifice oil passage, other end of the adjustable orifice oil passage is connected with the first orifice and the second orifice, the first orifice is also connected with the control oil input port, and the second orifice is also connected with the counterbalance valve control cavity.

5. The adjustable load pressure compensation balancing system according to claim 3, wherein when the input end of the backpressure check valve is connected with the first orifice, the first orifice is also connected with the second orifice and one end of the adjustable orifice oil passage, other end of the adjustable orifice oil passage is connected with the control oil input port, and the second orifice is also connected with the counterbalance valve control cavity.

6. The adjustable load pressure compensation balancing system according to claim 3, wherein when the input end of the backpressure check valve is connected with the second orifice, the second orifice is also connected with the first orifice and one end of the adjustable orifice oil passage, the first orifice is also connected with the control oil input port, and other end of the adjustable orifice oil passage is connected with the counterbalance valve control cavity.

7. The adjustable load pressure compensation balancing system according to claim 1, further comprising a filter screen disposed at the control oil input port.

8. An adjustable load pressure compensation counterbalance valve, comprising the adjustable load pressure compensation balancing system according to claim 1.

9. An end cover for an adjustable load pressure compensation counterbalance valve, comprising an end cover valve body, wherein:

a first cavity, a second cavity and a third cavity are formed in the end cover valve body, and the first cavity and the second cavity are connected with the third cavity;

an inlet of the first cavity is a control oil input port, and a filter screen and a first orifice are sequentially disposed inwards from the inlet of the first cavity;

a backpressure check valve is disposed in the second cavity, and an input end of the backpressure check valve is located on a side close to the third cavity;

an adjustable orifice is disposed in the third cavity, wherein the adjustable orifice comprises a plug, a spool on the adjustable orifice, a variable throttling groove, a spring seat, a spring, a spring shield and an adjusting screw;

the plug, the spool on the adjustable orifice, the spring seat and the spring are sequentially arranged in a channel direction of the third cavity;

the spring has an end connected with the spring seat and an another end connected with the adjusting screw, and the spring shield is disposed outside the spring;

the variable throttling groove is formed in the spool on the adjustable orifice;

the spool on the adjustable orifice has an end connected with a load port of a counterbalance valve, located outside the end cover valve body, and an another end connected with the spring seat, and the variable throttling groove is connected with a counterbalance valve control cavity of the counterbalance valve.

10. The end cover for an adjustable load pressure compensation counterbalance valve according to claim 9, further comprises a Glyd ring;

the Glyd ring is mounted in a groove in the spool on the adjustable orifice.

11. The end cover for an adjustable load pressure compensation counterbalance valve according to claim 9, further comprises an O ring;

the O ring is mounted between the spring shield and the end cover valve body.

12. The end cover for an adjustable load pressure compensation counterbalance valve according to claim 9, further comprises a combined sealing gasket and a protective cap;

the protective cap is connected with the adjusting screw by screw thread and presses the combined sealing gasket on an end surface of the spring shield.

13. An adjustable load pressure compensation counterbalance valve, comprising the end cover for an adjustable load pressure compensation counterbalance valve according to claim 9.

14. An adjustable load pressure compensation balancing system, comprising:

an adjustable orifice control module, wherein the adjustable orifice control module is used for receiving control oil and an oil from an outside, and the volume of the control oil passes through the adjustable orifice control module is increased with the increase of a pressure applied to the oil;

a counterbalance valve control module, wherein the counterbalance valve control module is used for receiving the control oil, and the oil passes through the counterbalance valve control module is decreased with the decrease of the control oil acting on the counterbalance valve control module;

an overcompensation rate adjustment module, used for adjusting an overcompensation rate of the counterbalance valve control module by disposing a plurality of detachable orifices;

wherein when the pressure applied to the counterbalance valve control module by the control oil is maximum, a pressure applied to the adjustable orifice control module by the control oil is minimum, and then the pressure applied to the counterbalance valve control module decreases, while the pressure applied to the adjustable orifice control module increases;

wherein the plurality of detachable orifices comprise two orifices, which are a first orifice and a second orifice respectively, wherein the adjustable orifice control module comprises an adjustable orifice, and the adjustable orifice comprises an adjustable orifice oil passage and an adjustable orifice control cavity, two ends of the adjustable orifice oil passage are connected with a control oil input port and a drainage port respectively, and the drainage port is used for recycling the control oil and oil in a counterbalance valve spring cavity of the counterbalance valve control module, the adjustable orifice control cavity is used for receiving oil from the outside, a size of the adjustable orifice oil passage is adjusted according to the pressure of the oil, and the adjustable orifice oil passage becomes larger with the increase of the pressure, wherein the counterbalance valve control module comprises a counterbalance valve, and the counterbalance valve comprises a first counterbalance valve oil passage, a second counterbalance valve oil passage and a counterbalance valve control cavity, the counterbalance valve control cavity is used for receiving the control oil, a size of the first counterbalance valve oil passage is adjusted according to the pressure of the control oil, the first counterbalance valve oil passage becomes larger with the increase of the pressure, and when the control oil is not received, the first counterbalance valve oil passage is disconnected, and a check valve is disposed in the second counterbalance valve oil passage, and the second counterbalance valve oil passage is connected only when the pressure applied to the counterbalance valve control module increases, and wherein the counterbalance valve control module further comprises a fourth orifice, and the oil in the counterbalance valve spring cavity returns to the drainage port through the fourth orifice.

* * * * *